Sept. 2, 1952 A. LESTI 2,609,529

PULSE CODE TRANSLATOR

Filed Jan. 7, 1950 3 Sheets-Sheet 1

INVENTOR
ARNOLD LESTI

BY R. P. Morris

ATTORNEY

Sept. 2, 1952 A. LESTI 2,609,529

PULSE CODE TRANSLATOR

Filed Jan. 7, 1950 3 Sheets-Sheet 2

INVENTOR
ARNOLD LESTI
BY R P Moore
ATTORNEY

Sept. 2, 1952 A. LESTI 2,609,529

PULSE CODE TRANSLATOR

Filed Jan. 7, 1950 3 Sheets-Sheet 3

INVENTOR
ARNOLD LESTI
BY R.P. Morris
ATTORNEY

Patented Sept. 2, 1952

2,609,529

UNITED STATES PATENT OFFICE 2,609,529

PULSE CODE TRANSLATOR

Arnold Lesti, Nutley, N. J., assignor to Federal Telecommunication Laboratories, Inc., New York, N. Y., a corporation of Delaware Application January 7, 1950, Serial No. 137,392

18 Claims. (Cl. 332—1)

This invention relates to pulse code translators and more particularly to a system for translating pulse time modulation signals into pulse code modulation signals.

Systems known generally as pulse code modulation systems are becoming increasingly important for use in communication. In these systems signal energy is translated into pulse code combinations representative of a discrete number of signal variations, these code combinations being later decoded to reproduce effectively the original signals. In pulse code systems so far proposed equipment is provided for obtaining measurements of amplitude of discrete signal portions, these amplitude measurements being translated in various pulse code combinations. The arrangements for establishing the discrete amplitude levels from a signal wave are generally referred to as quantizers and a number of different quantizers and coding circuits for the translation of amplitude modulations into codes have been heretofore proposed.

It is an object of this invention to provide a system for translating signals represented as time displacements of pulses, generally referred to as pulse time modulation or PTM, into pulse code combinations referred to generally as pulse code modulation or PCM signals.

In accordance with the invention there is provided a plurality of normally blocked coding circuits and first and second pulse sources, the pulse from one of these sources being time modulated. Pulses from one of these sources are sequentially applied to the coding circuit to condition them for release in different combinations representative of the different code signal combinations indicating signal amplitudes and the pulses from the other pulse source are applied also to the coding circuits related in time with the time modulation so that pulses may be released from these circuits in combinations corresponding to the pulse time modulation signals.

According to a feature of my invention the pulse coding circuits may take the form of coding tubes or other coding circuits. Either the time modulated pulses or other pulses related by an integral multiple, including unity, of the pulse repetition rate of the time modulated pulses, are applied to the coding circuits in time displaced fashion so that the coding circuits are sequentially conditioned for conduction. Pulses from a second source are then applied to these coding circuits so that in the circuits wherein both pulses are present conduction will occur. Thus there will be in the output of the tubes pulses corresponding to a predetermined code. By means of some distributor network these pulses may be applied to a common transmission medium as a pulse code combination representative of the particular time modulating signal. Either the pulse time modulated signals or the other pulses may be applied through the time distributor to the tubes, the pulse of the other source serving to trigger the tubes into operation.

In one form of my invention a delay means is provided which may constitute a single delay device or a plurality of delay devices, the total delaying action corresponding substantially to the maximum time displacement which the time modulated pulse undergoes. These delay means are coupled in different code combinations to separate ones of the coding tubes so that all of the coding combinations of the particular code in use will be sequentially established at the coding circuits. The other pulses then are applied to gate these tubes at a time when the distribution corresponds to the code indication allotted to a particular time position of the time modulated pulse. With this system any type of coding may be used, for example, the usual binary permutation coding, cyclic permutation coding or any arbitrary form of coding.

In accordance with a second embodiment of my invention one of said pulse sources may comprise an arrangement for applying to different coding circuits different coding pulse waves related in a series in accordance with the code combination to be used. The pulse time modulated energy is synchronised with the production of these coding pulses and is applied simultaneously to the coding gate circuits so that pulses will be released from these circuits corresponding to the particular voltage condition of each of these circuits at the time the time modulated pulse is applied.

The above-mentioned and other features and objects of this invention and the manner of attaining them will become more apparent and the invention itself will be best understood by reference to the following description of an embodiment of the invention taken in conjunction with the accompanying drawings, in which Fig. 1 shows a set of graphs explaining two known types of code combinations;

Figure 1:
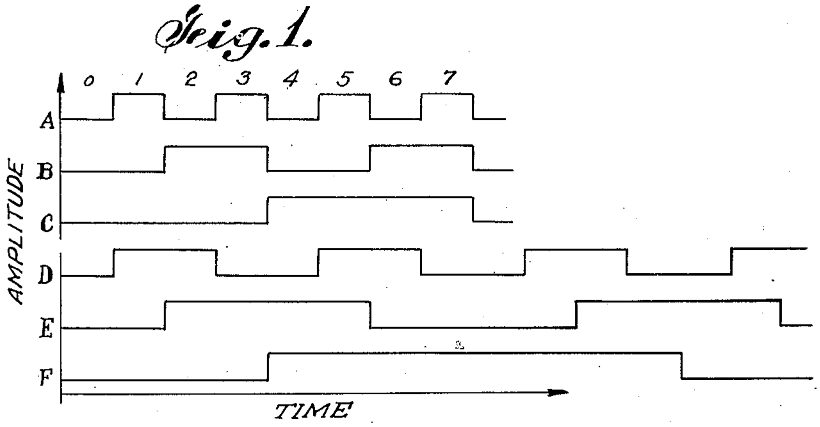

In a standard five unit code there are provided 32 signal unit levels extending from zero to 31. Accordingly in the description which follows the reference numerals 0–31 will be utilized to indicate these coding positions or corresponding amplitude variations of such signals. Turning now to Fig. 1, there is illustrated a diagram for explaining the operation of establishing a three-unit, eight-level binary permutation code in accordance with graphs A, B and C and the corresponding three-unit, eight level code of a cyclic progression or permutation code as illustrated in graph D, E and F. The eight signal levels are designated by reference numerals 0, 1, 2, 3, 4, 5, 6, and 7. In the three-unit binary permutation it will be noted that in graph A the signal is one value, for example, zero for reference level zero and a second level for 1. This graph continues on with the first value for zero and all even integer references of the code and a second level for 1 and all odd integer references of the code. For the second code element graph B shows that the signal is then maintained at the first condition for the first two amplitude reference levels, changes to the second condition for the next two amplitude reference levels, reverts to the first condition for the next two and repeats this cycle throughout. For the third signal element graph C shows that the first condition is maintained for the first four amplitude reference level conditions, changes to the second for the next four and so on. If additional signal elements are provided these again will be arranged so that the first condition exists for the first two changes of the next preceding code element and then changes for an equal number of code positions. This is the standard binary permutation coding and it is believed no further explanation is required.

For the cyclic permutation coding it will be noted that the graph D remains in the initial condition for the first coding level, changes to the second condition for the next two, returns to the first condition for the succeeding two, and so on. In graph E the second coding element remains at the first condition to the mid-point of the portion of graph D in its second condition, then changes to its second condition and remains there to the mid-point of the succeeding similar portion of graph D. Graph F again changes from the first to the second condition at the mid-point of the second portion of graph F and so on. Thus if the first condition is described as the spacing condition and the second as mark condition it will be seen that code combinations are set up for mark and space for each of the various levels to zero through 7 in different combinations for the two types of coding. It will be clear that other types of arbitrary coding may be adopted for transmitting of signals by codes but these two being the most prominent have been most thoroughly described.

Figure 2:
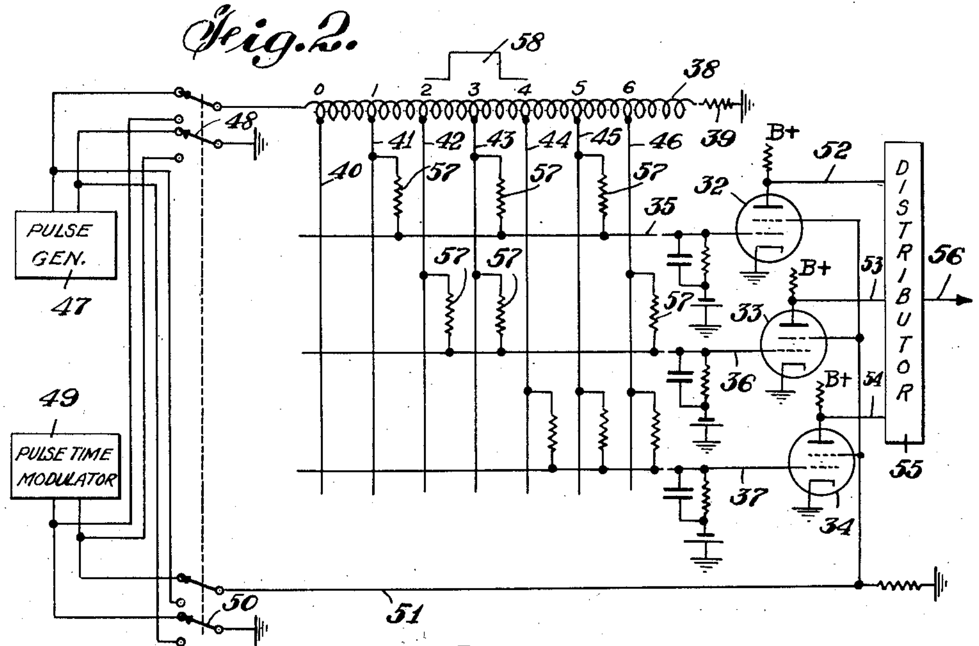
Fig. 2 is a schematic circuit diagram illustrating the principles of my invention applied to one type of binary code translator system.

With this explanation we turn now to Fig. 2 which illustrates an embodiment of my invention exemplified in a seven-level, three-unit binary permutation coding translator. A plurality of coding circuits including tubes 32, 33 and 34 are provided, these tubes being biased so as normally to be blocked for the passage of energy. To each of tubes 32, 33 and 34 are coupled coding lines 35, 36 and 37. A delay line 38 terminated in a resistor 39 is provided to which are connected at equal spaced tapped points, corresponding to the levels zero through 6, individual contacts 40, 41, 42, 43, 44, 45 and 46. Pulses from a pulse generator 47 may be applied to traverse along delay line 38, over switch 48 in its position as shown. A second pulse source is shown at 49, this source being a source of time modulated pulses. These pulses are applied over a switch 50 and line 51 to all of the code transmitter tubes 32—34 in parallel. Tubes 32—34 are so biased that the blocking will not be released except by simultaneous application of pulses from line 38 and line 51 thereto. At the time that simultaneous application of pulses does occur there will appear in the separate output lines 52, 53 and 54 pulse signals consisting of pulses representing the two code conditions of the code transmitter arrangements in a particular combination. These pulses may be applied over the distributor 55 to a common output medium 56. Distributor 55 may be any type of distributor, for example it may consist of delay lines of different value or may be any type of cyclic mechanical or electronic distributor. The separate lead lines 40—46 are coupled by means of resistors 57, to different ones of the coding lines 35, 36, 37 so as to establish sequentially through the operation of the delay device 38 different code combinations on the coding tubes 32—34. Preferably the pulses from generator 47 have a time duration substantially equal to fractional unit of the total time displacement of the time modulated pulses and the delay between lines 40, 41, etc. is so chosen that this delay is also substantially equal to the time duration of these applied pulses. Thus there will be a continuity of the code scanning as sequentially applied to tubes 32, 33 and 34. The time modulated pulses from the output of pulse time modulator 49 will appear at different times depending upon the degree of modulation so that the tubes will be triggered into action at the time corresponding to the particular time displacement and code pulses will therefore be established corresponding to this level.

If desired switches 48 and 50 may be changed in position to their lower contacts thus applying the time modulation pulses from source 49 to delay line 38 and the regularly spaced pulses from generator 47 to triggering line 51. The two sets of pulses will thus establish the code translation as previously described.

Figure 3:
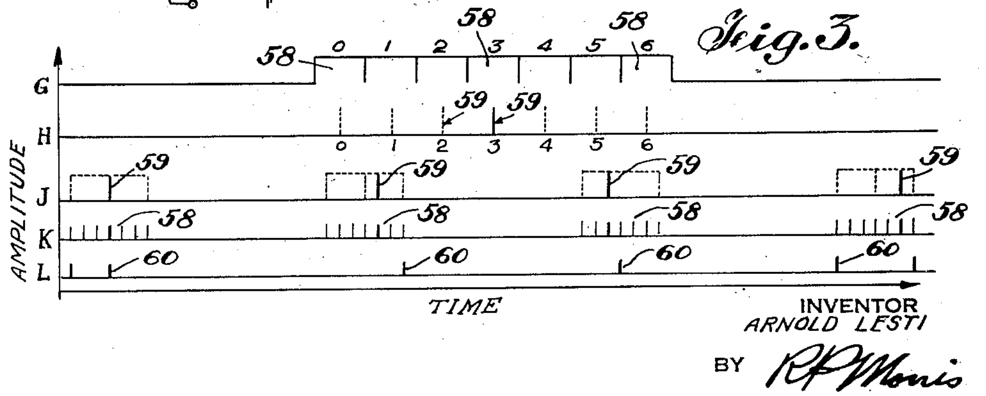
Fig. 3 is a set of graphs used in explaining the system illustrated in Fig. 2.

Referring to Fig. 3 a clear understanding of the operation of the system may be had. In this figure the ordinates represent amplitude and the abscissae represent time. In this figure graph G represents 0, 1, 2, 3, 4, 5, and 6, the successive time positions of a pulse 58 midway over each of the corresponding positions 0–6 shown in Fig. 2. Graph H represents a modulated pulse 59 in each of its corresponding time positions 0 through 6 representing the modulation values of the signal. As shown this pulse 59 is in instantaneous time position 3 representing for example zero modulation level midway of its maximum and minimum swing, thus corresponding to position 3 in the coding circuit of Fig. 2. In the binary code of Fig. 2 this will be a mark-mark-space indication as set up in the coding tubes 32—34 so that there will be two output pulses at this coding position. In graphs J, K, and L of Fig. 3 there is shown respectively the pulse 59 in four different modulation positions corresponding to positions 3, 4, 2 and 5 respectively of the coding connections in Fig. 2. K illustrates the corresponding coincidence timing of the pulses from generator 47. The position of pulse 58 corresponding to time modulated pulses 59 being indicated by a heavier line. In graph L are shown pulse code combinations 60 representative of the various code positions of the pulse time modulated wave.

It will be seen from the above explanation that the circuit of Fig. 2 will serve to translate pulse time modulated energy from modulator 49 into the desired pulse code combinations. While the circuit of Fig. 2 has been shown by way of example as applied to a simple three element code it will be understood that this may be expanded to cover for use in any multi-element code dependent upon the number of amplitude levels necessary for carrying an intelligible signal. For speech it is clear that more than the seven levels illustrated may be required. Under these circumstances a 5, 6 or even higher unit code may be used.

Figure 4:
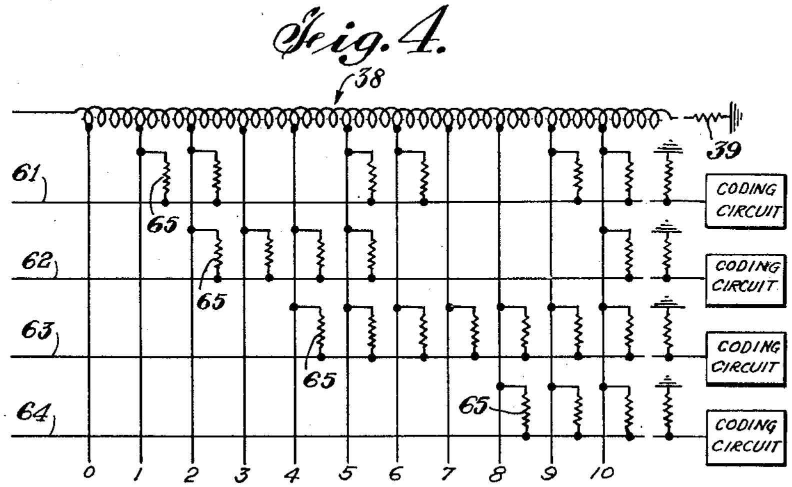
Fig. 4 is a modification of a portion of the illustration of Fig. 2 showing a cyclic permutation code combination.

In Fig. 4 is shown a code conductor system substantially to that of Fig. 3 but connected for transmission of a ten-level, four-unit cyclic progression code. In this connection there are provided ten tapping points on delay line 38 and four coding conductors 61, 62, 63 and 64. The tapping points from delay means 38 are coupled through coupling resistors 65 to the separate coding conductors 61—64 in the cyclic permutation code combinations representing the 0 to 10 amplitude levels. It is understood that with the four-unit code up to 16 amplitude levels could be provided. The coding operation proceeding for the circuit of Fig. 4 is identical with that described in connection with Fig. 2 so it will not be repeated in detail here.

It will be understood in connection with both these illustrations that a single delay line as shown at 38 need not be provided since the same time distribution could be obtained by individual delay lines or other delay devices each having delay values corresponding to the sections of lines 38 between the points 0—1, 0—2 etc., 0 through 6 inclusive. This has not been illustrated since the simpler form shown in these figures is generally preferable. It will likewise be clear that also any arbitrary code may be established by connection of the various delay line portions to different ones of the coding conductors in any arbitrary manner desired. This system is therefore extremely flexible as any desider arbitrary code combination can be used, although in general practice one of the more usual forms would likely be adopted.

Volume compression or expansion may be achieved with the system as herein described by effectively changing the tapping points on resistor 38 as desired. An illustration of this form and volume compression is given in Figs. 5 and 6 wherein the coding circuit is shown for a 32-level, 5-element binary permutation code. In this figure the delay line 38 is shown provided with regularly spaced taps 0 through 31 inclusive.

Figure 6:
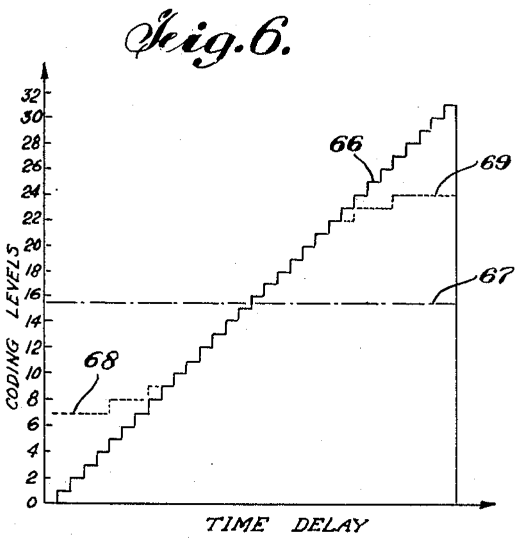
Fig. 6 is a graph illustrating a volume compressor action of the circuit of Fig. 5.

In Fig. 6 there is illustrated the stepped curve 66 each step of which represents one of the amplitude levels from zero to 31. It will be clear that the zero signal modulation level will then be at level 16 as indicated by the dot dash line 67 of Fig. 6.

Figure 5:
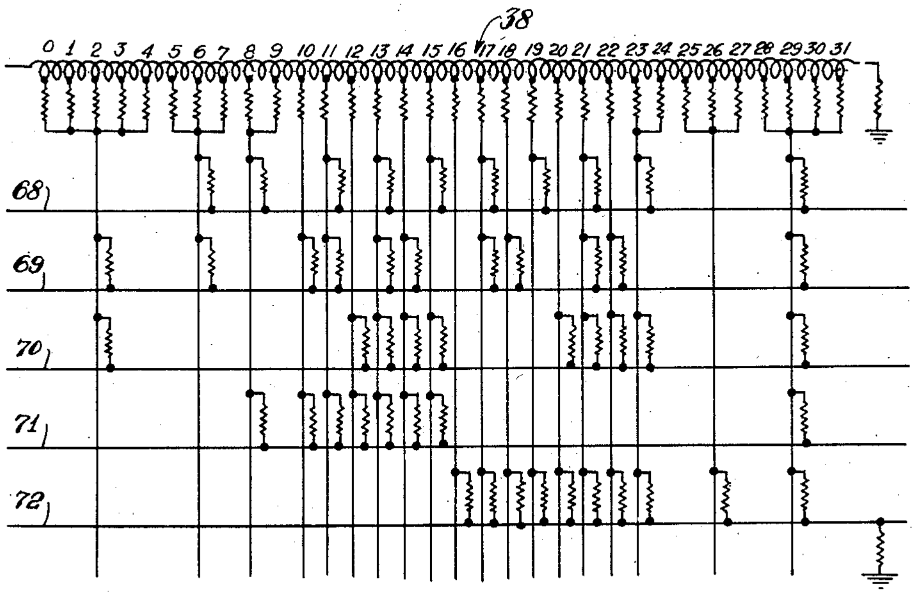
Fig. 5 is a modification of the circuit such as shown in Fig. 2 illustrating a method for volume compression utilizing a system of this invention.

Reverting to Fig. 5 the five coding conductors are shown at 68, 69, 70, 71 and 72 respectively. The tapping points corresponding to energy levels 8, 9 are inter-connected and are coupled to lines 68 and 71 to establish the code combination corresponding for amplitude level 9 for both tapping points 8 and 9. Tapping points 5, 6, 7 are interconnected and connected to coding conductor 68 and 69 to establish a code level corresponding to that normally represented at coding position 8 and tapping points 0—4 are interconnected and connected to coding leads 69 and 70 to establish a coding level corresponding to the normal coding level at tapping point 7. It will thus be seen that in the negative swing of the time modulated pulses the coding swing will only go from level 16 down to level 7, thus accomplishing a volume compression for this negative swing. Similarly at the upper end or positive PTM swing tapping points 23, 24 are connected together and connected to coding lines 68, 70 and 72 to establish the normal coding connections for tapping point 38. Tapping points 25 to 27 are interconnected and connected to the coding conductor 72 to establish the code connections normally provided for at level 23, and tapping points 28—31 are interconnected and connected to the coding conductors 68, 69, 70, 71 and 72 to establish the normal coding level for coding position 25. Thus at the positive end of the PTM sweep the code level in between 16 and level 25, thus compressing the signal on this side. The variation provided in the step wave of 66 is indicated by dotted lines 68 and 69, Fig. 6.

Figure 7:
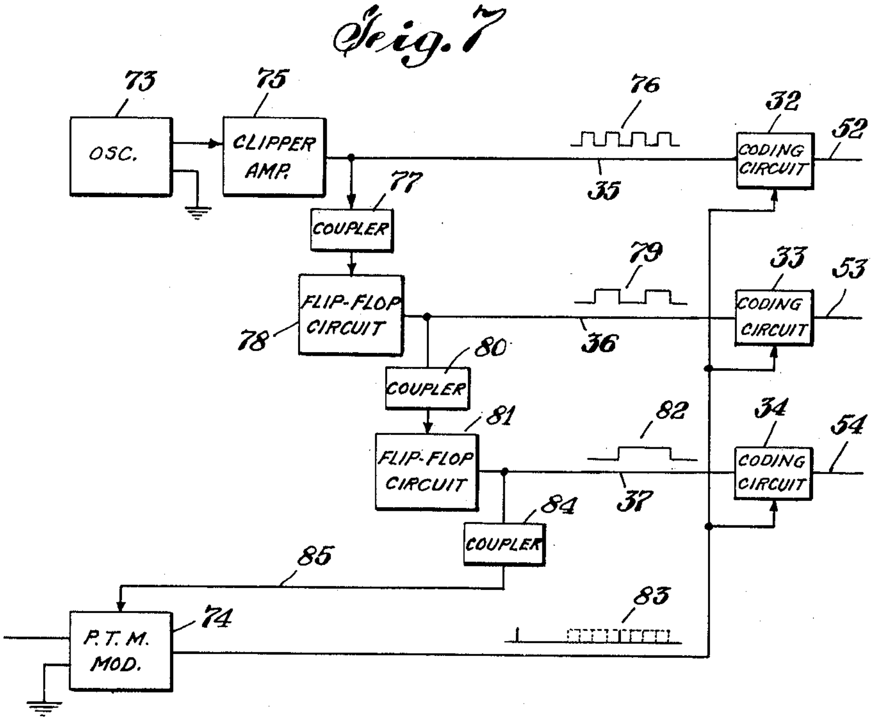
Fig. 7 is a still further modification of a circuit incorporating this invention.

While code translators utilising the delay means distributor arrangements as shown in the foregoing figures have the advantage of complete flexibility of code in some instances it may be desirable to utilize a different type of system for accomplishing the translation. A modified circuit incorporating the features of this invention and using a different type of system for establishing the unblocking condition of the coding circuit is illustrated in Fig. 7. This Fig. 7 again is drawn to represent a three-unit code which inherently can carry only eight different amplitude levels from 0 to 7. In this connecting coding circuits 32, 33 and 34 similar to those of Fig. 1 are indicated by simple rectangles and three coding conductors 35, 36 and 37 are shown connected thereto. The first pulse source in this case may comprise an oscillator 73 which operates at a frequency equal to a multiple of the normally unmodulated spacing position of the time modulated pulses from pulse time modulation source 74. Output energy from this oscillator is applied to a clipper amplifier 75 which serves to clip the sine wave oscillations from 73 and amplify them to provide a series of coding pulses 76 corresponding to those of graphs A or D of Fig. 1. The output from clipper amplifier 75 is applied to coding tube 32 and through coupling circuit 77 to a first trigger circuit 78 which may be what is known as flip-flop circuit or a trigger circuit of the Eccles-Jordan type, in which circuit changes from one stable condition to a second stable condition in response to each applied pulse. Thus output wave 79 is produced in line 36 corresponding to graph B or E of Fig. 1. In order to obtain graph E of Fig. 1 coupling circuit 77 must include a delay circuit or a delay circuit must be inserted in line 35 so that the pulses of 79 will be initiated midway of pulse 77 of Fig. 1. The output wave 76 is applied to coding circuit 33 and over coupling circuit 80 to a second flip-flop circuit 81 which may be identical in form to that described in connection with 78. The output of flip-flop 81 will be a pulse 82 corresponding to the pulses shown in graph C or F of Fig. 1. Here again the delay provisions in coupling circuit 80 or in line 37 must be provided if the system for graph F is to be obtained. Pulses 82 have the same repetition rate as time modulated pulses 83 from pulse time modulator 74. These pulses are applied to coding circuit 34 which may also be applied through a coupling circuit 84 and line 85 to synchronise pulse time modulator source 74 so that the time modulated pulses are properly synchronised with the coding waves 76—82. It will be evident that as waves 76, 79 and 82 are successively applied to the coding circuits 32, 33 and 34 respectively its circuits will be sequentially conditioned for release at different positions corresponding to the eight coding levels of the system. Accordingly, when the pulses 83 from modulator 74 are applied to these coding circuits pulses will be released through the output lines 52, 53, 54 into proper coding position to correspond with the coding combinations for the particular amplitude level related to the pulse time modulation. This circuit may be desirable in many applications since it may be designed with only the number of flip-flop circuits corresponding to the various code elements and does not require individual delay devices for each of the amplitude levels to be taken care of. From the above description the operation of the system in translating time modulation into pulse code modulation is believed to be clear.

It will be understood that while a few examples have been given herein of the particular coding circuits the principles of the invention will be readily adapted for application to other types of coding systems and circuits without requiring inventive skill.

While I have described above the principles of my invention in connection with specific apparatus, it is to be clearly understood that this description is made only by way of example and not as a limitation to the scope of my invention.

What I claim is:

1. A system for translating pulse time modulation signals into pulse code modulation signals comprising a plurality of normally blocked coding circuits, a first pulse source, a second pulse source, the pulses of one of said sources being time modulated, means for sequentially conditioning said coding circuits for release in different combinations corresponding to the different code signal amplitude levels under control of pulses from said first source and means for releasing said coding circuits under control of pulses from said second source in accordance with the time modulation of said pulse time modulation signals to provide corresponding code combinations.

2. A system according to claim 1, wherein said means for conditioning comprises successively valued delay means coupled to said first source and to selected ones of said coding circuits.

3. A system according to claim 2, wherein said delay means comprises a common delay line, provided with spaced tapping points for coupling to said coding circuits.

4. A system according to claim 3, wherein said tapping points are spaced to provide substantially equal delay periods.

5. A system according to claim 4, wherein said first pulse source comprises a source of pulses having a repetition rate substantially equal to the repetition rate of the unmodulated pulses from said second pulse source.

6. A system according to claim 5, wherein said first pulse source provides pulses having a duration substantially equal to the time delay between said tapping points.

7. A system according to claim 6, wherein said first pulse source is coupled to said delay means.

8. A system according to claim 1, wherein said first source comprises a source of time modulated pulses of a given repetition rate, and said second source comprises a source of pulses related to the pulses from said first source as an integral multiple including unity of said predetermined rate.

9. A system according to claim 8, wherein said second source comprises a plurality of pulse producing means individually coupled to said coding circuit, one of said pulse producing means operating at said predetermined repetition rate, and the others at successively higher harmonics thereof.

10. A system according to claim 8, wherein said second source comprises a source of pulses having a repetition rate substantially equal to the unmodulated repetition rate of said time modulated pulses.

11. A translator for translating pulse time modulation signals into pulse code modulation signals comprising a first source of pulses having a predetermined pulse repetition rate and a predetermined modulation time displacement representing amplitude levels of a modulating signal, a second source of pulses having a repetition rate related as an integral multiple including unity of said predetermined repetition rate, a predetermined number of normally blocked coding circuits releasable under control of simultaneous application thereto of pulses from both said sources, means for applying pulses to respective selected ones of said coding circuits from one of said sources in different combinations corresponding with a predetermined number of different signal amplitude levels and means for applying pulses from the other of said source to all said coding circuits.

12. A translator according to claim 11, wherein the repetition rate of said pulses is substantially the same as said unmodulated repetition rate, said pulses each having a duration corresponding with the time displacement of said modulated pulses representing signal amplitudes within the corresponding amplitude level.

13. A translator according to claim 12, wherein said first source is coupled with said means for applying pulses to said coding circuits.

14. A translator according to claim 12, wherein said second source is coupled with said means for applying pulses to said coding circuits.

15. A translator according to claim 11, wherein said means for applying pulses comprises delay means having a total delay substantially equal to the extreme time displacements of said time modulated pulses.

16. A translator according to claim 15 wherein said delay means comprises a delay line provided with spaced tapping points.

17. A translator according to claim 16, wherein said tapping points are coupled to said coding circuits in different combinations corresponding with different characters of a predetermined code.

18. A translator according to claim 17 wherein means are provided for intercoupling certain of said tapping points to provide a modification of the signal amplitudes as applied to said coding circuits.

ARNOLD LESTI.

REFERENCES CITED

The following references are of record in the file of this patent:

UNITED STATES PATENTS

| Number | Name | Date |
| --- | --- | --- |
| 2,403,561 | Smith | July 9, 1946 |
| 2,429,616 | Grieg | Oct. 28, 1947 |
| 2,485,591 | Grieg | Oct. 25, 1949 |